(12) United States Patent
Kovsh et al.

(10) Patent No.: US 8,401,392 B2
(45) Date of Patent: Mar. 19, 2013

(54) FLEXIBLE BRANCHING UNIT AND SYSTEM INCLUDING THE SAME

(75) Inventors: Dmitriy Kovsh, Hoboken, NJ (US); Stuart M. Abbott, Marlboro, NJ (US); Haifeng Li, Morganville, NJ (US)

(73) Assignee: Tyco Electronics Subsea Communications LLC, Eatontown, NJ (US)

( * ) Notice: Subject to any disclaimer, the term of this patent is extended or adjusted under 35 U.S.C. 154(b) by 444 days.

(21) Appl. No.: 12/707,604

(22) Filed: Feb. 17, 2010

(65) Prior Publication Data
US 2011/0200322 A1 Aug. 18, 2011

(51) Int. Cl.
*H04J 14/02* (2006.01)

(52) U.S. Cl. ............... 398/83; 398/85; 398/82; 398/79; 398/2

(58) Field of Classification Search .......... 398/79, 398/82–85, 2, 7
See application file for complete search history.

(56) References Cited

U.S. PATENT DOCUMENTS

| | | | |
|---|---|---|---|
| 5,488,500 A | 1/1996 | Glance | |
| 5,526,153 A | 6/1996 | Glance | |
| 5,526,157 A * | 6/1996 | Kawano | 398/1 |
| 5,771,112 A | 6/1998 | Hamel et al. | |
| 5,838,477 A * | 11/1998 | Yamamoto et al. | 398/105 |
| 6,049,405 A | 4/2000 | Oberg | |
| 6,088,141 A * | 7/2000 | Merli et al. | 398/5 |
| 6,115,155 A * | 9/2000 | Liu et al. | 398/5 |
| 6,243,179 B1 | 6/2001 | Thompson et al. | |
| 6,327,060 B1 * | 12/2001 | Otani et al. | 398/83 |
| 6,433,900 B1 * | 8/2002 | Kuroyanagi et al. | 398/19 |
| 6,466,341 B1 | 10/2002 | Lumish et al. | |
| 6,721,509 B2 * | 4/2004 | Xiao et al. | 398/83 |
| 6,895,187 B1 * | 5/2005 | Webb | 398/104 |
| 6,907,159 B1 * | 6/2005 | Daniel | 385/24 |
| 6,934,434 B1 * | 8/2005 | Kumayasu et al. | 385/16 |
| 7,085,456 B1 * | 8/2006 | Nagel et al. | 385/100 |
| 7,280,761 B2 * | 10/2007 | Aono | 398/94 |
| 7,430,373 B2 * | 9/2008 | Yamashita | 398/83 |
| 7,574,140 B2 * | 8/2009 | Manna et al. | 398/105 |
| 8,290,361 B2 * | 10/2012 | Nakano | 398/9 |
| 2002/0057477 A1 * | 5/2002 | Rocca et al. | 359/141 |
| 2002/0093729 A1 | 7/2002 | Gerish et al. | |
| 2005/0213980 A1 * | 9/2005 | Ota | 398/84 |

(Continued)

FOREIGN PATENT DOCUMENTS

JP 2001217901 8/2001

OTHER PUBLICATIONS

International Search Report and Written Opinion dated Apr. 19, 2011 issued in related International Patent Application No. PCT/US2011/025159.

*Primary Examiner* — Daniel Washburn
*Assistant Examiner* — Hibret Woldekidan (57) ABSTRACT

Fault tolerance may be achieved in a branched optical communication system such that a fault in one optical path may not affect optical signals coupled from a healthy optical path. In general, a flexible branching unit is configured, when adding and dropping channels, to select channels from a healthy path and not from the faulty path (e.g., a trunk path or a branch path) to prevent non-uniform channel loading on the trunk path after the branching unit. In this manner, a fault detected on the trunk path may not affect signals from the branch path and a fault detected on the branch path may not affect signals from the trunk path, thereby providing fault tolerance. A flexible branching unit may also be capable of adjusting the number and selection of channels that are added and dropped at the branching unit.

12 Claims, 7 Drawing Sheets

U.S. PATENT DOCUMENTS

| | | |
|---|---|---|
| 2005/0226621 A1* | 10/2005 | Kikuchi et al. ............... 398/83 |
| 2005/0286905 A1 | 12/2005 | Mohs |
| 2006/0018658 A1* | 1/2006 | Mori ............................ 398/79 |
| 2006/0051093 A1 | 3/2006 | Manna |
| 2007/0003283 A1* | 1/2007 | Feuer et al. ................... 398/83 |
| 2010/0008672 A1* | 1/2010 | Kovsh et al. .................. 398/85 |
| 2010/0290786 A1* | 11/2010 | Abbott .......................... 398/79 |

* cited by examiner

FLEXIBLE BRANCHING UNIT AND SYSTEM INCLUDING THE SAME

TECHNICAL FIELD

The present disclosure relates to optical transmission systems, and, in particular, to a flexible branching unit configured for fault tolerance and/or coupling flexibility and a system including the same.

BACKGROUND

To maximize the transmission capacity of an optical fiber transmission system, a single optical fiber may be used to carry multiple optical signals in what is called a wavelength division multiplexed system (hereinafter a WDM system). The multiple optical signals may be multiplexed to form a multiplexed signal or WDM signal with each of the multiple signals being modulated on separate wavelengths referred to as channels. Modern WDM systems have a high traffic capacity, for example, a capacity to carry 96 channels or more at 10 gigabits per second (hereinafter Gb/s) or more.

The optical fiber transmission system may include a relatively long trunk fiber segment that may be terminated at a transmitting and/or receiving trunk terminal. The optical fiber transmission system may further include one or more branching units situated along its trunk. Each branching unit (BU) may be connected to a branch fiber segment that terminates in a transmitting and/or receiving branch terminal. Each BU may include one or more optical add/drop multiplexers (OADM). Channels may be added to and/or dropped from the trunk fiber segment of the optical transmission system via the OADMs.

When information signals are transmitted over long distances, one or more amplifiers are provided to compensate for signal attenuation. The amplifiers used in some WDM systems (e.g., undersea systems) cannot easily be modified once installed and are initially configured to support a fully loaded link (e.g., 96 channels, each channel carrying 10 Gb/s). In general, it may be desirable that the power per channel be sufficient to provide an adequate signal-to-noise ratio in the presence of the amplified spontaneous emission (ASE) noise from the amplifiers, necessitating a high amplifier total output power for systems with high fully-loaded capacity. The amplifiers may thus be configured to provide an optical output signal at a nominal total optical power.

The nominal amplifier output power level may be insensitive to the power at the input of the amplifier. As the amplifier input power varies over a wide range, the total amplifier output power may change very little around the nominal output power level. As additional channels are added, e.g. at a branching unit, the optical output power per channel may decrease. As channels are dropped, the optical output power per channel may increase.

Optical signals, while propagating through optical fibers, can experience nonlinear interaction. At sufficiently high values of optical power (e.g., more than 1 mW per channel), the optical signal may experience more distortion than at low optical powers (e.g., less than 1 mW per channel) which results in transmission penalty. Therefore, when channels are dropped, e.g., at a branching unit, the value of optical channel power may increase, and network communication performance may suffer. Partial channel loading of a chain of optical amplifiers may result in undesirable noise accumulation in parts of the transmission band and gain reshaping effects that also degrade channel performance.

For example, in the case of a fiber fault, e.g., a cable cut, or a disconnect of a transmitter, a network may lose its designed uniform loading due to the absence of one or more signals and lower power on the channels that carry those signals. Depending on the location of the fault, ASE noise may or may not substitute for the lost signals. Additional ASE noise may also penalize signal-to-noise ratio (SNR) of the remaining signals. If the fault is in a trunk segment and the channel loading is not uniform, signals added at a branching unit may be penalized by the non-uniform loading on the trunk segment. Similarly, if the fault is in a branch segment and the channel loading is not uniform, signals on the trunk segment, passing through the branching unit, may be penalized. It may therefore be desirable to configure a branching unit for fault tolerance to protect signals on a "healthy" path from penalties caused by a fault on another path.

In an undersea optical fiber transmission system, for example, a branching unit may be deployed at remote locations, e.g., on an ocean floor. The branching unit may be configured, at deployment, for adding and/or dropping signals occupying particular channels. The specific configuration may depend on predicted and/or anticipated traffic. The actual traffic may vary from the prediction. Modifying a branching unit, post-deployment, may involve relatively significant cost. It may therefore be desirable to provide a flexible branching unit that may be reconfigured according to, e.g., actual traffic, without modifying the branching unit.

BRIEF DESCRIPTION OF THE DRAWINGS

Reference should be made to the following detailed description which should be read in conjunction with the following figures, wherein like numerals represent like parts.

DETAILED DESCRIPTION

Fault tolerance may be achieved in a branched optical communication system such that a fault in one optical path may not affect optical signals coupled from a healthy optical path. In general, a flexible branching unit, consistent with the present disclosure, is configured, when adding and dropping channels, to select channels from a healthy path and not from the faulty path (e.g., a trunk path or a branch path) to prevent non-uniform channel loading on the trunk path. In this manner, a fault detected on the trunk path may not affect signals from the branch path and a fault detected on the branch path may not affect signals from the trunk path, thereby providing fault tolerance. A flexible branching unit may also be capable of adjusting the number and selection of channels that are added and dropped at the branching unit.

Figure 1:
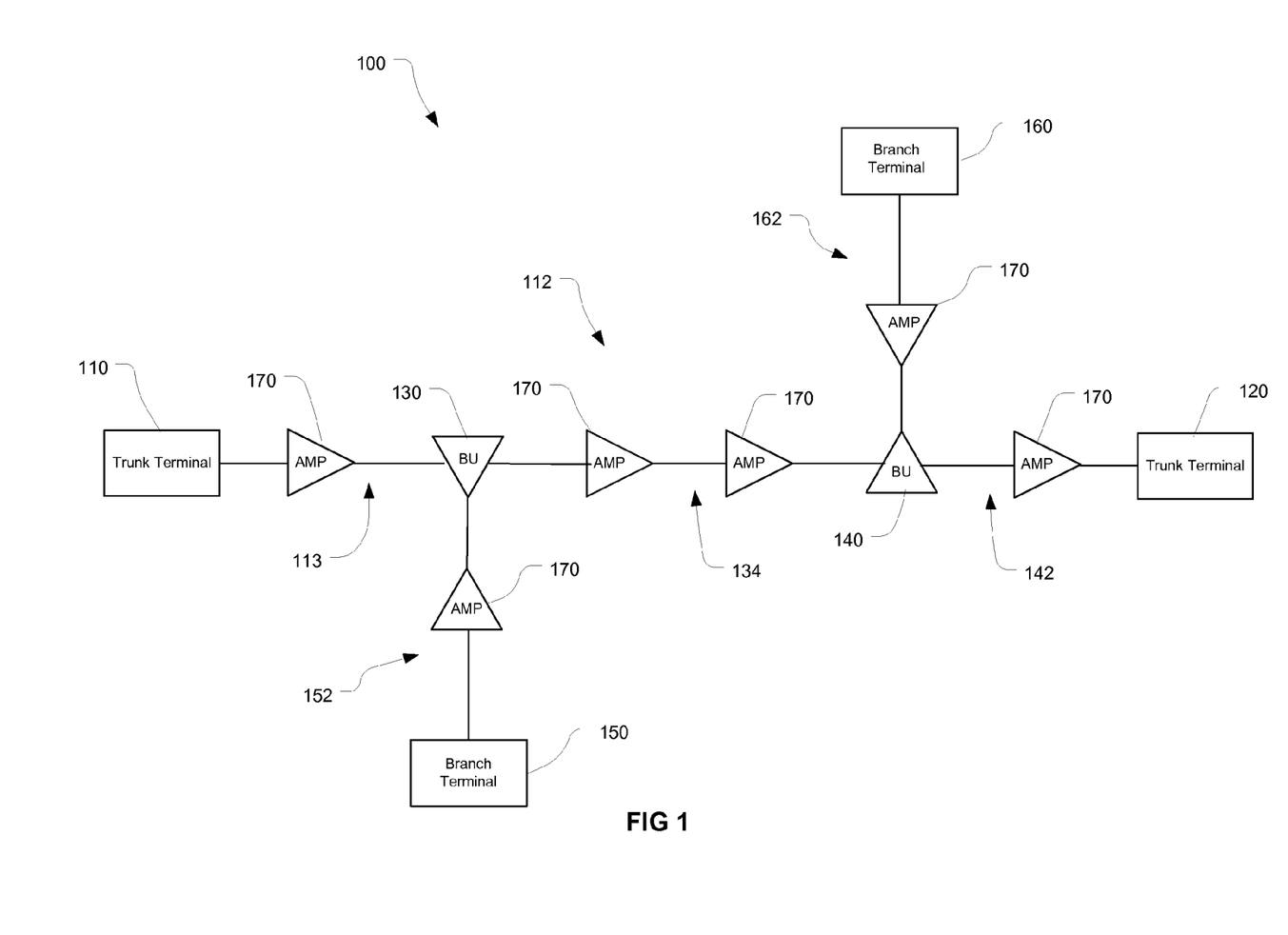
FIG. 1 is a schematic illustration of an optical communication system consistent with the present disclosure.

Turning now to FIG. 1, there is illustrated an exemplary optical communication system 100 consistent with the present disclosure. Those skilled in the art will recognize that the system 100 has been depicted in highly simplified form for ease of explanation. The optical communication system 100 includes trunk terminals 110 and 120 coupled to a trunk path 112. The term "coupled" as used herein refers to any connection, coupling, link or the like by which signals carried by one system element are imparted to the "coupled" element. Such "coupled" devices are not necessarily directly connected to one another and may be separated by intermediate components or devices that may manipulate or modify such signals.

The trunk path 112 may include a plurality of optical cable segments, e.g. cable segments 113, 134, 142, for carrying optical signals. Each cable segment may include one or more sections of optical fiber cable including optical fiber pairs and one or more repeaters 170 to provide a transmission path for bi-directional communication of optical signals between trunk terminal 110 and trunk terminal 120.

One or more branching units, e.g., branching units 130 and 140, may be coupled to the trunk path between the trunk terminals 110, 120. Each branching unit 130, 140 may be further coupled to a branch terminal, e.g., branch terminals 150 and 160, respectively, through an associated branch path 152, 162, respectively, perhaps through one or more repeaters 170 and linking optical cables. The system 100 may therefore be configured to provide bi-directional communication of optical signals between terminals 110, 120, 150 and/or 160 using the same trunk fiber pair, although multiple fiber pairs may be used and supported by each of the branching units 130, 140. For ease of explanation the description herein may refer to transmission from one terminal to another. It is to be understood, however, that the system 100 may be configured for bi-directional or uni-directional communication between any of the terminals 110, 120, 150 and/or 160.

The components in the trunk and branch paths may include known configurations for achieving their intended functionality. The repeaters 170, for example, may include any known optical amplifier/repeater configuration that compensates for signal attenuation on the transmission path. For example, one or more of the repeaters may be configured as an optical amplifier, such as an erbium doped fiber amplifier (EDFA), a Raman amplifier, or a hybrid Raman/EDFA amplifier. Also, one or more of the repeaters may be provided in a known optical-electrical-optical configuration that regenerates an optical signal by converting it to an electrical signal, processing the electrical signal and then retransmitting the optical signal.

System 100 may be configured as a long-haul system, e.g. having a length between at least two of the terminals of more than about 600 km, and may span a body of water. When used to span a body of water, e.g. an ocean, amplifiers 170 and/or branching units 130 and/or 140 may be seated on the ocean floor and the trunk path 112 path may span between beach landings. It will be appreciated that a plurality of repeaters, branching units and optical media links may be disposed beneath water and/or over land.

The system 100 is a wavelength division multiplexed (WDM) system capable of transmitting, carrying and receiving a WDM signal including a plurality of multiplexed optical signals modulated on a plurality of different wavelengths referred to as channels. An optical information signal may originate at one or more of the trunk terminals and/or one or more of the branch terminals. Each branching unit 130, 140 may be configured to add and/or drop one or more information signals using, for example, an optical add/drop multiplexer (OADM). For example, a WDM signal that originates at trunk terminal 110 may include one or more information signals (i.e., trunk signals) that occupy one or more channels on the trunk path 112 (i.e., trunk channels). Likewise, a WDM signal that originates at branch terminal 150 may also include one or more information signals (i.e., branch signals) that occupy one or more branch channels on the branch path 152 (i.e., branch channels). Both WDM signals may be transmitted to a branching unit 130. Branching unit 130 may be configured to drop, i.e. extract, one or more information signals originating from the trunk terminal 110 and pass the dropped trunk signals to the branch terminal 150. Branching unit 130 may be configured to add, i.e. insert, one or more information signals originating from branch terminal 150 to at least a portion of the WDM signal originating from the trunk terminal 110 and pass the resulting WDM optical signal, i.e. including the added branch signals, onto segment 134. The resulting WDM optical signal may be received by branching unit 140. Branching unit 140 may similarly add and/or drop information signals. It will be appreciated that information signals that originate at terminal 120 and/or branch terminal 160 may be likewise added and/or dropped at branching unit 140 with a resulting optical signal transmitted to branching unit 130. Branching unit 130 may similarly add and/or drop information signals and pass a resulting optical signal to terminal 110.

Thus, a WDM signal transmitted along at least a portion of the trunk path 112 occupies a plurality of channels (i.e., trunk channels) and a WDM signal transmitted along the branch path, e.g., branch path 152 or 162, occupies a plurality of channels (i.e., branch channels). In a WDM system, a channel may be utilized or unutilized. As used herein, "utilized channels" refer to WDM system channel locations that contain information carrying signals and "unutilized channels" refer to WDM system channel locations that do not contain information carrying signals.

One or more of the utilized trunk channels (referred to as express channels) may pass through one or more of the branching units 130, 140 without being dropped, for example, carrying information signals from one trunk terminal 110 (origination) to the other trunk terminal 120 (destination). One or more of the utilized trunk channels (referred to as add/drop channels) may be added and/or dropped at one or more branching units 130, 140 and correspond in wavelength to one or more of the utilized branch channels (referred to as add/drop channels). Thus, an add/drop channel may extend between a trunk terminal 110 and a branch terminal 150 or between a branch terminal 150 and another branch terminal 150. Because the wavelength of a channel that is dropped at a branching unit is re-used when adding a channel at the branching unit, the add/drop channels may also be referred to as re-use channels.

In order to maintain uniform channel loading over the fiber optic network, unutilized channels may be loaded at trunk or branch terminals with loading signals. As used herein "loading signal" refers to a non-information carrying signal such as broadband noise, e.g. ASE noise, ASE noise band, or a dummy tone. As used herein "dummy tones" shall refer to optical energy that is centered on a specific wavelength and that does not carry information or traffic. The entire transmission band entering and exiting the branching units may, therefore, be uniformly loaded with either loading signals or information signals. In one embodiment, the loading signals may be loaded onto unutilized channels at about the same optical power as the information signals on the utilized channels. The loading signals may, therefore, draw a proportionate share of repeater power similar to the share drawn by the information signals, thereby avoiding the deleterious effects of transmitting unloaded parts of the band. As used herein, "uniform loading" does not necessarily require the same channel power on each of the channels in a transmission band.

Loading signals may be generated and placed at unutilized channels of the trunk and/or branch terminals by methods known to those of ordinary skill in the art. In an embodiment where one or more loading signals are broadband noise, the noise may be generated and added to unutilized channels, for example, as disclosed in U.S. Patent Application Publication Number 2005/0286905 A1, entitled "Optical Fiber Transmission System with Noise Loading", published Dec. 29, 2005, the teachings of which are hereby fully incorporated herein by reference. For example, broadband noise may be generated by an amplifier and added to unutilized channels using appropriate filters and couplers. The amplifier, which may be a rare earth-doped fiber amplifier, may be configured to provide a substantially constant output power independent of input power. If the amplifiers inputs are unloaded or minimally loaded, the amplifier may generate ASE noise. The ASE noise added to WDM signals may be broadband, i.e. extending across the system bandwidth, and/or may be filtered resulting in ASE noise occupying one or more bands or sub-bands within the system bandwidth. In an embodiment where one or more loading signals are dummy tones, the dummy tones may be generated, for example, by using a continuous-wave non-modulated laser source, as described for example in U.S. Patent Application Publication No. 2006/0051093 A1, entitled "System and Method for Spectral Loading an Optical Transmission System", published Mar. 9, 2006, the teachings of which are hereby fully incorporated herein by reference.

A WDM system may experience a fault that results in non-uniform channel loading and consequent SNR penalty or degradation in a propagating information signal due to fiber non-linearities. For example, a fiber in a trunk or branch path may be damaged or cut and/or a transmitter at a trunk or branch terminal may be disconnected. If a signal occupying a degraded channel is then coupled with a signal occupying a healthy channel at, e.g., a branching unit, the signal occupying the healthy channel may be degraded. For example, if a fiber in a trunk path is damaged, one or more trunk signals (i.e., in a WDM trunk input signal) occupying one or more trunk channels may be degraded or lost (e.g., replaced with ASE). If a degraded trunk signal is then coupled with a healthy branch signal at a branching unit to produce a WDM trunk output signal, the branch signal may become degraded in the WDM trunk output signal.

Generally, systems and methods consistent with the present disclosure address this issue by configuring a branching unit to couple signals occupying healthy channels for output from the branching unit. The branching unit may be configured to detect a fault in a trunk or branch path and to adjust an output in response to detecting the fault. For example, a branching unit, consistent with the present disclosure, may be configured to receive a WDM trunk input signal including one or more trunk signals occupying one or more of a plurality of trunk channels and a WDM branch input signal including one or more branch signals occupying one or more of a plurality of branch channels. The branching unit may be configured to provide a WDM trunk output signal including the WDM trunk input signal if a fault is detected on the branch path, the WDM branch input signal if a fault is detected on the trunk path or at least one trunk signal and at least one branch signal if no fault is detected. In this manner, a fault detected on the trunk path may not affect signals from the branch path and a fault detected on the branch path may not affect signals on the trunk path, thereby providing fault tolerance.

Figure 2:
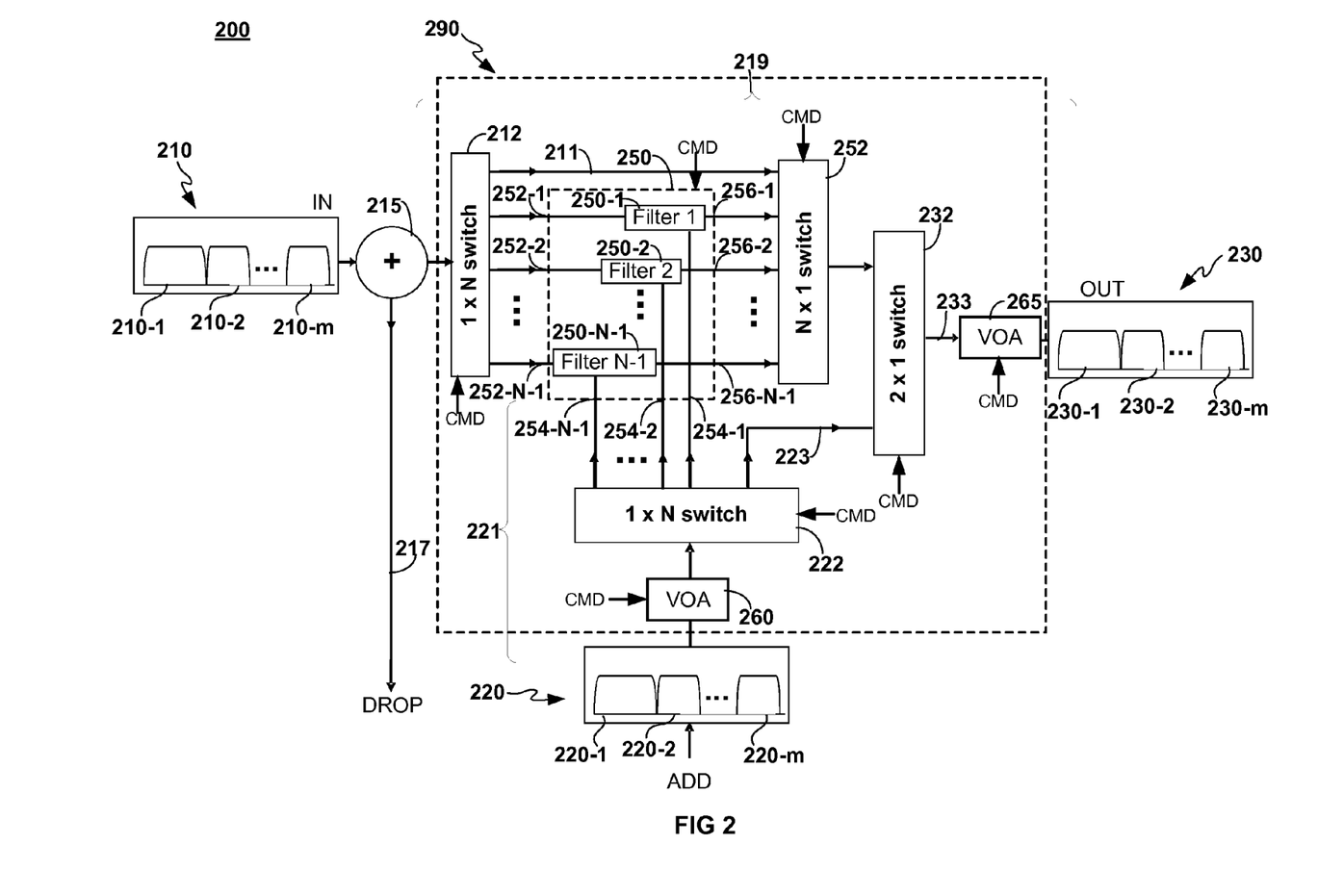
FIG. 2 is a functional block diagram of a generalized flexible branching unit, consistent with the present disclosure.

FIG. 2 is a block diagram of one exemplary embodiment of a flexible branching unit 200 useful in a system consistent with the present disclosure. FIG. 2 includes pictorial illustrations of optical spectra corresponding to a WDM trunk input signal, a WDM branch input signal and a WDM trunk output signal. The WDM trunk input signal may include multiple trunk information signals occupying multiple trunk channels (e.g., express channels and/or add/drop channels). The WDM branch input signal may include multiple branch signals occupying multiple branch channels (e.g., add/drop channels). It will be appreciated by those of ordinary skill in the art that an actual optical spectra may include additional trunk and/or branch signals occupying additional trunk and/or branch channels. The spectra depicted in FIG. 2 are simplified for ease of explanation. The branching unit 200 may correspond to branching unit 130 and/or branching unit 140 of FIG. 1. The branching unit 200 may be configured to provide a WDM trunk output signal that may include the WDM trunk input signal, the WDM branch input signal or a portion of the WDM trunk input signal and a portion of the WDM branch input signal, based, at least in part, on whether a fault is detected.

For example, the branching unit 200 may be configured to receive a WDM trunk input signal 210 including one or more trunk signals occupying one or more trunk channels 210-1, ..., 210-$m$. The branching unit 200 may be configured to receive a WDM branch input signal 220 including one or more branch signals occupying one or more branch channels 220-1, ..., 220-$m$. For example, the trunk input signal 210 may be received from cable segment 113, 134 or 142 in FIG. 1 and the branch input signal 220 may be received from (may originate at) branch terminal 150 or 160. The branching unit 200 may be configured to provide a WDM trunk output signal 230. The WDM trunk output signal 230 may include one or more trunk signals occupying one or more trunk output channels 230-1, ..., 230-$m$. The WDM trunk output signal 230 may correspond to the WDM trunk input signal 210 if a fault is detected on a branch path, the WDM branch input signal 220 if a fault is detected on a trunk path or at least one trunk signal occupying one or more trunk channels 210-1, ..., 210-$m$ and at least one branch signal occupying one or more branch channels 220-1, ..., 220-$m$ if no fault is detected.

Branching unit 200 may include a coupler 215 configured to couple the WDM trunk input signal 210 onto a drop path 217 and onto an express path 219. The coupler 215 may be an optical coupler as will be known to those of ordinary skill in the art. For example, the WDM trunk input signal 210 may include a signal destined for a branch terminal, e.g., branch terminal 150 or 160 of FIG. 1, coupled to branching unit 200.

Branching unit 200 may include a plurality of optical switches. Generally, an optical switch may be configured to controllably and/or selectively couple an input path to an output path. For example, a 1×N optical switch may controllably couple one input path to a selected one of a number, e.g., N, of output paths. In another example, a N×1 optical switch may controllably couple a selected one of a number, e.g., N, input paths to one output path. A signal on the input path may then be selectively and/or controllably coupled to the output path. For example, path selection for coupling may be controlled by a command signal.

An optical switch may be any known optical switch technology. As will be understood by those of ordinary skill in the art, the optical switch may be configured to adjust a light beam and/or an optical fiber to perform a switching operation. For example, the optical switch may utilize microelectromechanical systems (MEMS) to adjust a micro-minor to controllably couple a signal on an input path to an output path.

For example, branching unit 200 may include a trunk input optical switch 212, a filter optical switch 252 and a trunk output optical switch 232 on the express path 219 and a branch input optical switch 222 on an add path 221. The branching unit 200 may further include a filter stage 250 coupled to the trunk input optical switch 212, the filter optical switch 252 and the branch input optical switch 222. The filter stage 250 may be coupled between the trunk input optical switch 212 and the filter optical switch 252 on the express path 219. The trunk input optical switch 212 may additionally be directly coupled to the filter optical switch 252 on a direct express path 211. The filter stage 250 may be coupled between the branch input optical switch 222 and the filter optical switch 252. The branch input optical switch 222 may additionally be directly coupled to the trunk output optical switch 232 on a direct add path 223. In an embodiment, the trunk input optical switch 212 and branch input optical switch 222 may be 1×N optical switches, the filter optical switch may be an N×1 optical switch and the trunk output optical switch 232 may be a 2×1 optical switch. It will be appreciated by those of ordinary skill in the art that N may be any number, e.g., N=4.

The trunk input optical switch 212 may be configured to selectively couple the WDM trunk input signal 210 to the filter optical switch 252 or a respective one of one or more trunk inputs 252-1, . . . , 252-N-1 to the filter stage 250. The branch input optical switch 222 may be configured to selectively couple the WDM branch input signal 220 to the trunk output optical switch 232 or a respective one of one or more branch inputs 254-1, . . . , 254-N-1 to the filter stage 250. The filter optical switch 252 may be configured to selectively couple a respective one of one or more outputs 256-1, . . . , 256-N-1 of the filter stage 250 or the trunk input optical switch 212 to the trunk output optical switch 232. The trunk output optical switch 232 may be configured to couple the filter optical switch 252 or the branch input optical switch 222 to a trunk output path 233.

For example, in response to a fault detected on a branch path coupled to add path 221, e.g., branch path 152 or 162 of FIG. 1, the WDM trunk input signal 210 may be coupled along the direct express path 211 to the trunk output path 233 by the trunk input switch 212, filter switch 252 and the trunk output switch 232. In another example, in response to a fault detected on a trunk path, the WDM branch input signal 220 may be coupled along the direct add path 223 to the trunk output path 233 by the branch input switch 222 and the trunk output switch 232. In another example, if no fault is detected, the WDM trunk input signal 210 may be coupled to the filter stage 250 by the trunk input switch 212 and the WDM branch input signal 220 may be coupled to the filter stage 250 by the branch input switch 222. A respective one of the one or more outputs 256-1, . . . , or 256-N-1 of the filter stage 250 may then be coupled to the trunk output path 233 by the filter switch 252 and trunk output switch 232. For example, the respective one of the one or more outputs 256-1, . . . , or 256-N-1 of the filter stage 250 may be selected based on a command signal. As discussed in more detail below, the command signal may be provided, for example, by a controller.

For example, the trunk input optical switch 212, branch input optical switch 222, filter optical switch 252 and trunk output optical switch 232 may be configured to receive a command signal CMD. Based on the command signal CMD, each optical switch may be configured to couple an input of the optical switch to an output of the optical switch. For example, the trunk input switch 212 may be configured to receive the WDM trunk input signal 210 from coupler 215 and the branch input switch 222 may be configured to receive the WDM branch input signal 220 from the add path 221. The trunk input switch 212 may be configured to selectively couple the WDM trunk input signal 210 directly to the filter switch 252 or to a respective one of one or more trunk inputs 252-1, . . . , or 252-N-1 of the filter stage 250 based, at least in part, on the command signal CMD. Similarly, based, at least in part, on the command signal CMD, the branch input switch 222 may be configured to couple the WDM branch input signal 220 directly to the trunk output switch 232 or to a respective one of one or more branch inputs 254-1, . . . , or 254-N-1 of the filter stage 250. The filter optical switch 252 may be configured to selectively couple the WDM trunk input signal 210 or the respective one of the one or more filter stage outputs 256-1, . . . , or 256-N-1 to the trunk output switch 232, based at least in part, on the command signal CMD. The trunk output optical switch 232 may be configured to selectively couple the WDM trunk input signal 210 or the filter stage output 256-1, . . . , or 256-N-1 or branch input signal 220 to the trunk output path 233, based at least in part on the command signal CMD.

Figure 3:
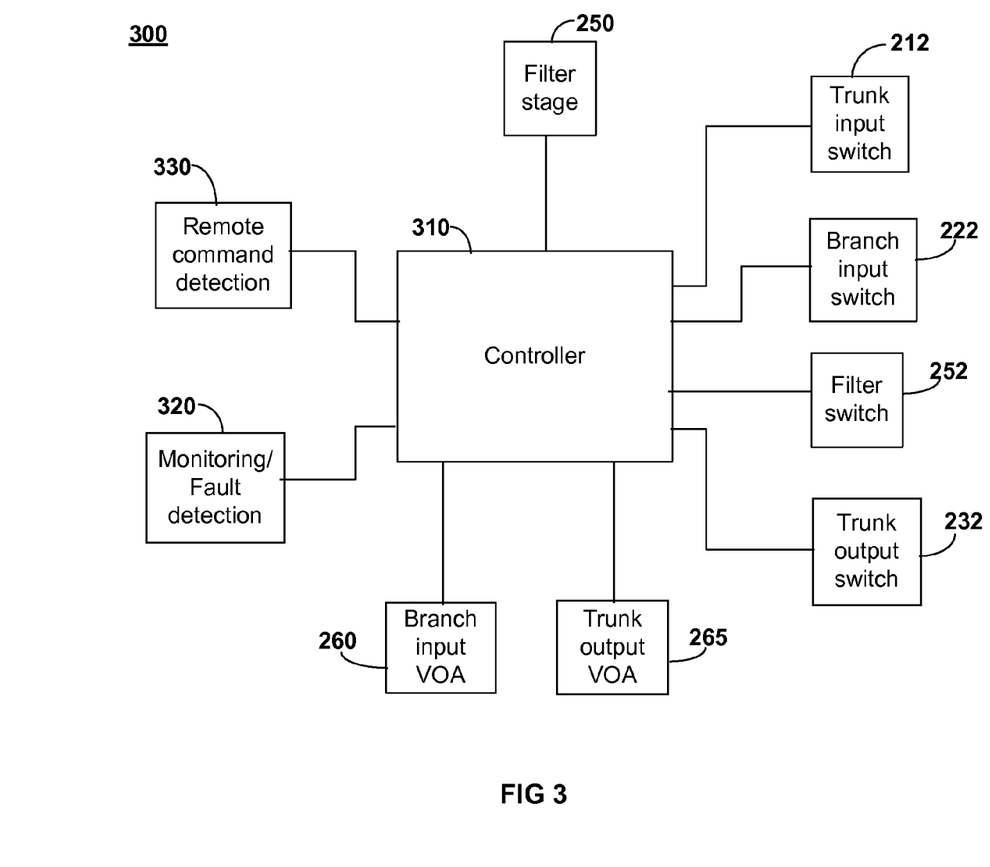
FIG. 3 is a functional block diagram of control circuit for a flexible branching unit.

FIG. 3 is a block diagram of an exemplary control circuit 300 that may be used in a branching unit consistent with the present disclosure. The control circuit 300 may include a controller 310 coupled to the trunk input switch 212, branch input switch 222, trunk output switch 232, and filter switch 252. The controller 310 may be configured to monitor the branching unit 200, trunk path 112 and/or a branch path 152 or 162 (see FIG. 1) for a fault. Based on a result of the monitoring, the controller 310 may be configured to provide a command signal CMD to the optical switches 212, 222, 232, 252 to couple an input to an output for each optical switch. The term "controller" as used herein may include programmable hardware elements and/or a combination of hardware, software and firmware. For example, a controller may be a microcontroller, e.g., including a CPU, memory (e.g., read/write and/or read-only), and/or peripherals capable of input and output. In another example, a controller may be implemented as an ASIC, i.e., a "system on a chip", or an FPGA, or the like. As will be appreciated by those of ordinary skill in the art, the command signal CMD may include one or more commands destined for one or more switches 212, 222, 252 and/or 232 and/or the filter stage 250. The command signal is shown as CMD for ease of illustration.

For example, the controller 310 may be configured to receive a signal indicating a fault on a trunk path, e.g., trunk path 112, or a branch path, e.g., branch path 152 or 162, from a remote fault monitoring entity. In another example, the controller 310 may be configured to monitor the branching unit 200 locally for fault detection. For example, a lost or degraded signal in the trunk input signal 210 or branch input signal 220 may indicate a fault on a respective trunk path or branch path. For example, the fault may be a result of a cut or damaged fiber. In another example, the fault may be a result of a disconnected transmitter at, e.g., a trunk or branch terminal. The controller 310 may then provide the command signal CMD to each of the optical switches based on the fault detected.

For example, if a fault is detected on the trunk path, the controller 310 may send a command to optical switches 222, 232 to couple the WDM branch input signal 220 to the trunk output path 233. The branch input signal 220 may then propagate from the branch input switch 222 along the direct add path 223 to the trunk output switch 232 to the trunk output path 233. In another example, if a fault is detected on the branch path, e.g., branch path 152, 162, the controller 310 may send a command to optical switches 212, 252, 232 to couple the WDM trunk input signal 210 to the trunk output path 233. The trunk input signal 210 may then propagate along the direct express path 211 from the trunk input switch 212 through the filter switch 252 and the trunk output switch 232 to the trunk output path 233. The controller 310 may switch among various filter options as a result of a command sent from the trunk or branch terminal or as a result of a pre-programmed command that was generated based on the information collected by the branching unit itself (e.g., via power monitoring equipment).

Accordingly, in the absence of a fault on the trunk path, the WDM trunk input signal 210, including one or more trunk signals occupying one or more trunk channels, may be uniformly loaded. If a fault is detected on a branch path, the uniformly loaded trunk input signal 210, including the trunk signals, may then be provided to the trunk output path 233 and may not be affected by the fault on the branch path. Similarly, in the absence of a fault on the branch path, the WDM branch input signal 220, including one or more branch signals occupying one or more branch channels, may be uniformly loaded. If a fault is detected on the trunk path, the uniformly loaded branch input signal 220, including the plurality of branch signals, may then be provided to the trunk output path 233. If no fault is detected on the branch path or the trunk path, the WDM trunk input signal 210 and the WDM branch input signal 220 may be coupled to the filter stage 250. The filter stage 250 may be configured to couple at least one respective trunk signal of the WDM trunk input signal 210 with at least one respective branch signal of the WDM branch input signal 220 and to provide an output including the respective signals. In this manner, a fault detected on a trunk or branch path may not affect a signal from another path, providing fault tolerance.

Turning again to FIG. 2, the branching unit 200 may include a plurality of variable optical attenuators (VOAs) 260, 265. Each VOA may allow for selective attenuation of one or more wavelengths of a branch signal and/or a trunk signal. A command signal may be provided to each VOA to set each VOA to a desired or attenuation level. For example, a branch input VOA 260 on the add path 221 may be used to adjust a relative power between a branch signal in the WDM branch input signal 220 and a trunk signal in the WDM trunk input signal 210. In this manner, a power ratio between, e.g., a branch signal and a trunk signal may be maintained at a design level. In another example, a trunk output VOA 265 on the trunk output path 233 may be used to adjust a power level of one or more wavelengths of the trunk output signal 230. In this manner, a power level at an output of the branching unit 200 may be controlled.

For example, the command signal may be provided by a controller. The controller 310 may be coupled to the branch input VOA 260 and/or the trunk output VOA 265. The controller 310 may be configured to receive a signal representative of a remote command from, e.g., a command detection function 330. The controller 310 may be configured to adjust the attenuation of each VOA 260, 265 based, at least in part, on the received signal. In another example, the command detection function 330 may be coupled to the VOAs 260, 265 and the attenuation of each VOA 260, 265 may be adjusted based on a command from the command detection function 330.

Figure 4:
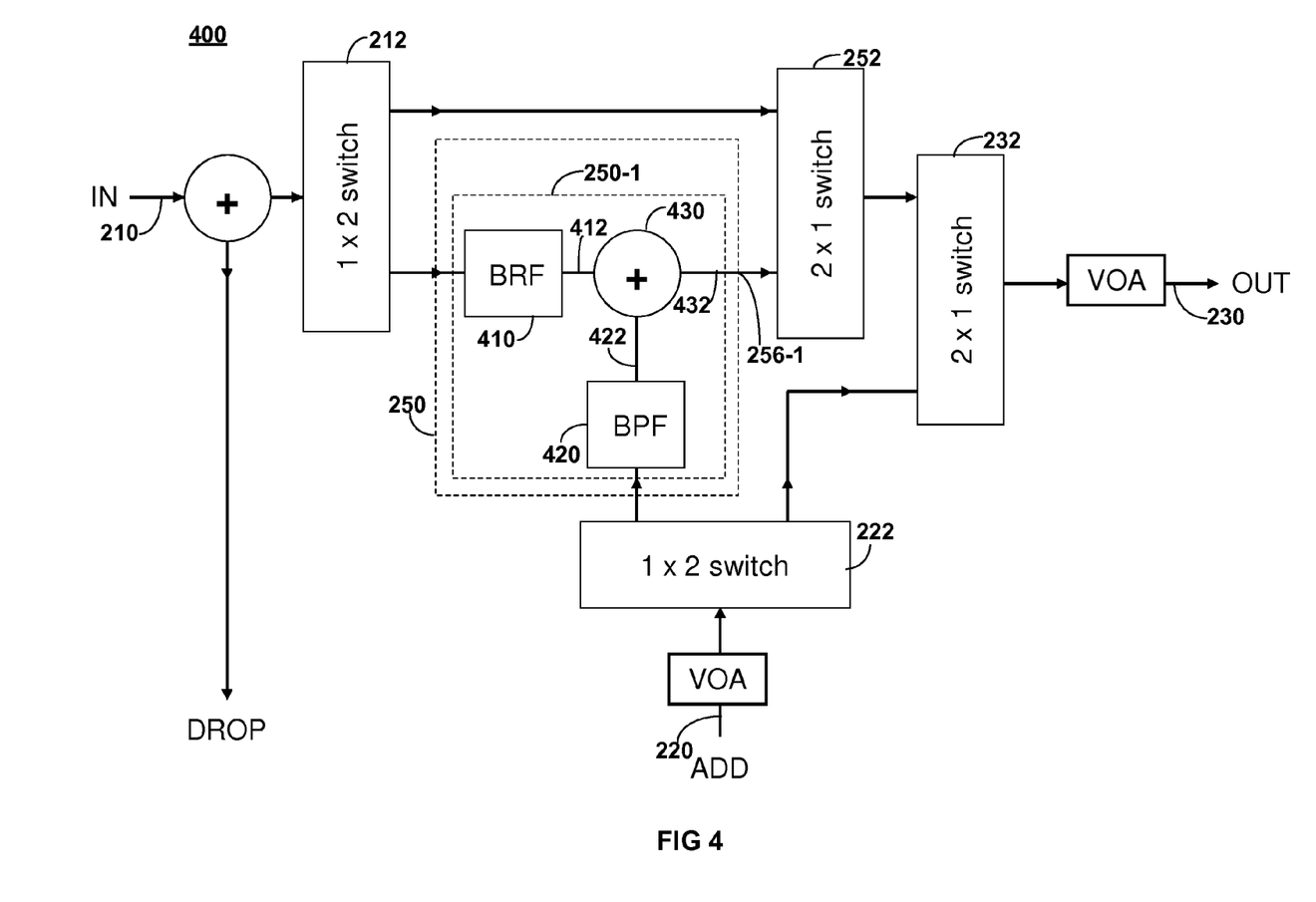
FIG. 4 is a functional block diagram of one example of a flexible branching unit with a filter including a band reject filter, a band pass filter and a coupler.

FIG. 4 shows one example of a flexible branching unit 400 that may be used in a system consistent with the present disclosure. In this example, the number, N, associated with the optical switches 212, 222, 252 is two. Accordingly, the filter stage 250 includes one (N-1) filter 250-1. The branching unit 400 may be configured to receive a WDM trunk input signal 210, a WDM branch input signal 220 and to provide a WDM trunk output signal 230. If a fault is detected on a branch path coupled to branching unit 400, branching unit 400 may be configured to couple the WDM trunk input signal 210 to the WDM trunk output signal 230 using switches 212, 252 and 232, bypassing filter 250-1. If a fault is detected on a trunk path coupled to branching unit 400, branching unit 400 may be configured to couple the WDM branch input signal 220 to the WDM trunk output signal 230 using switches 222 and 232, bypassing filter 250-1. If no fault is detected, the branching unit 400 may be configured to couple the WDM trunk input signal 210 and WDM branch input signal 220 to filter stage 250 and filter 250-1.

In this example, the filter 250-1 includes a trunk filter 410, a branch filter 420 and a coupler 430. The trunk filter 410 may be coupled to an output of the trunk input switch 212 and may be configured to receive the trunk input signal 210 as input and to provide a filtered trunk portion 412 as output. For example, the trunk filter 410 may be a band reject filter (BRF) configured to attenuate (filter out) one or more trunk signals on wavelength bands corresponding to one or more trunk channels and to pass the remaining trunk signals. For example, the trunk filter 410 may be configured to attenuate a signal occupying a re-use channel and to pass a signal occupying an express channel. The branch filter 420 may be coupled to an output of the branch input switch 222 and may be configured to receive the branch input signal 220 as input and to provide a filtered branch portion 422 as output. For example, the branch filter 420 may be a band pass filter (BPF) and may be configured to pass one or more branch signals on wavelength bands corresponding to one or more branch channels and to attenuate the remaining branch signals. For example, the branch filter 420 may be configured to pass a signal occupying a re-use channel and to attenuate an unutilized channel. In an embodiment, a pass band of the BPF 420 may correspond to a reject band of the BRF 410. In other words, a wavelength corresponding to the trunk channel being dropped may be the same as a wavelength corresponding to the branch channel being added.

The coupler 430 may be coupled to the trunk filter 410, branch filter 420 and an output 256-1 of the filter stage 250. The coupler 430 may be configured to combine the output of the trunk filter 410, e.g., the filtered trunk portion 412, and the output of the branch filter 420, e.g., the filtered branch portion 422, into a filter output signal 432. The coupler 430 may then provide the filter output signal 432 onto a filter stage output, e.g., filter stage output 256-1. For example, the coupler 430 may be configured to combine the trunk signal(s) passed by the band reject filter 410 and the branch signal(s) passed by the band pass filter 420 into the filter output signal 432 and to provide this filter output signal 432 to the filter stage output 256-1.

Figure 5:
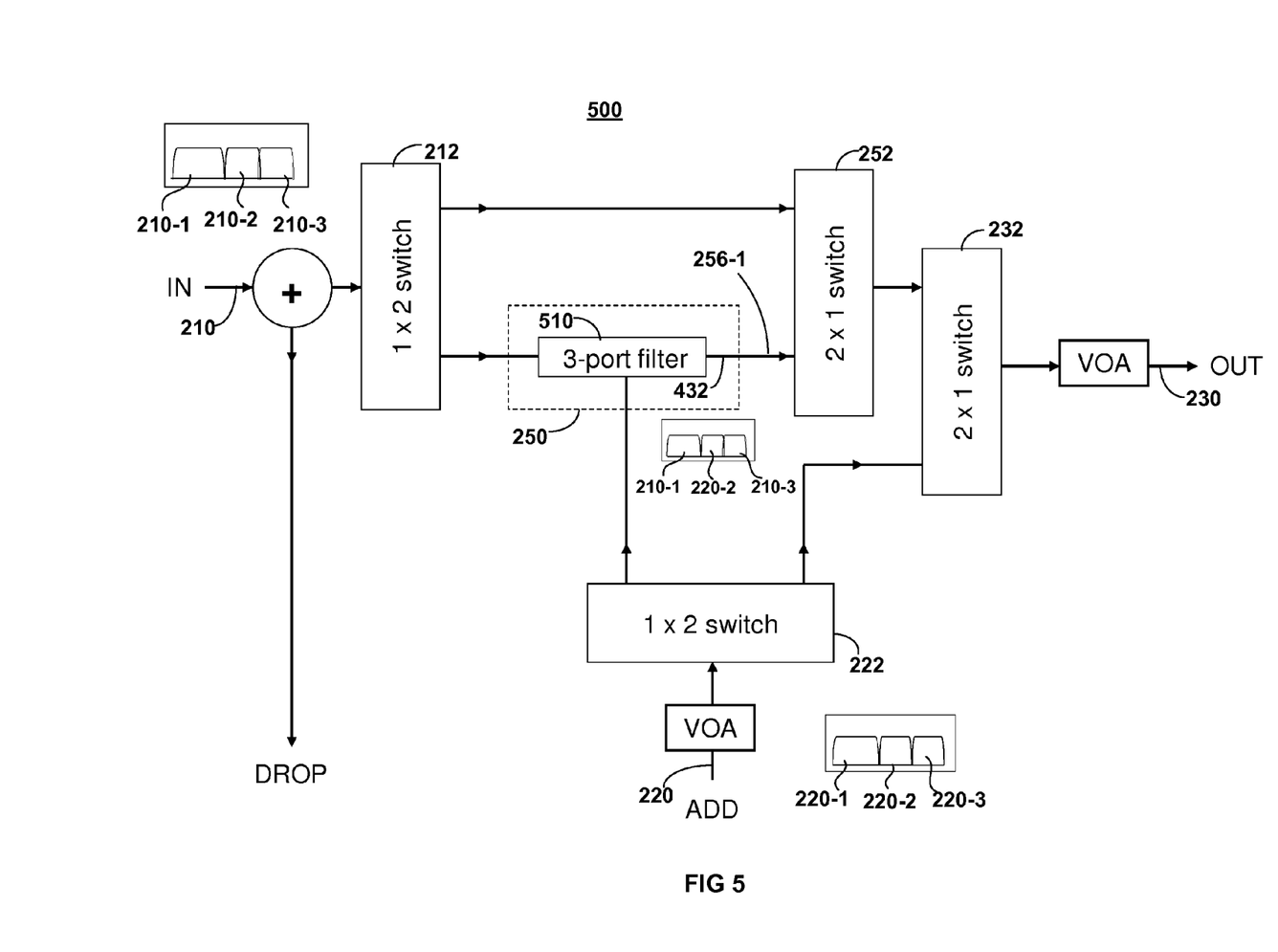
FIG. 5 is a functional block diagram of another example of a flexible branching unit with a 3-port filter.

FIG. 5 shows another example of a flexible branching unit 500 consistent with the present disclosure. In this example, the number, N, associated with the optical switches 212, 222, 252 is two. Accordingly, the filter stage 250 includes one (N-1) filter 510. The branching unit 500 may be configured to receive a WDM trunk input signal 210, a WDM branch input signal 220 and to provide a WDM trunk output signal 230. If a fault is detected on a branch path coupled to branching unit 500, branching unit 500 may be configured to couple the WDM trunk input signal 210 to the WDM trunk output signal 230 using switches 212, 252 and 232, bypassing filter stage 250. If a fault is detected on a trunk path coupled to branching unit 500, branching unit 500 may be configured to couple the WDM branch input signal 220 to the trunk output signal 230 using switches 222 and 232, bypassing filter stage 250. If no fault is detected, the branching unit 500 may be configured to couple the WDM trunk input signal 210 and WDM branch input signal 220 to filter stage 250 and filter 510.

In this example, the filter 510 is a 3-port filter. The 3-port filter 510 may be coupled to an output of the trunk input switch 212, an output of the branch input switch 222 and a filter stage output, e.g., filter stage output 256-1. The 3-port filter 510 may be configured to receive the trunk input signal 210 and the branch input signal 220 as inputs and to provide a filter output signal 432 as output. For example, the 3-port filter 510 may be configured to attenuate (filter out) one or more trunk signals on wavelength bands (e.g., band 210-2) corresponding to one or more trunk channels and to pass the remaining trunk signals (e.g., bands 210-1, 210-3). The 3-port filter may be configured to pass one or more branch signals on wavelength bands (e.g., 220-2) corresponding to one or more branch channels and to attenuate the remaining branch signals (e.g., 220-1, 220-3). For example, a wavelength corresponding to an attenuated trunk channel may be the same as a wavelength corresponding to a passed branch channel. The 3-port filter 510 may be configured to combine the passed trunk signal(s) and the passed branch signal(s) into the filter output signal 432 (e.g., including bands 210-1, 220-2, 210-3) and to provide this filter output signal 432 to the filter stage output 256-1. Only three signal bands are shown schematically in FIG. 5 for purposes of providing a simplified illustration.

A branching unit consistent with the present disclosure may provide flexibility in channel utilization of a branched WDM communication system. For example, at system deployment, a branch terminal may utilize a first subset of branch channels and may load the unutilized channels in the branch input signal 220 with loading signals. Based on traffic, for example, it may be desirable to increase or decrease the number of utilized channels to a second subset of branch channels. For example, if the number of utilized channels is increased, the number of unutilized channels in the branch input signal 220 may be similarly decreased. A flexible branching unit consistent with the present disclosure may include a first filter configured for use at system deployment, and a second filter configured for the increased traffic. The first filter may be configured to pass branch signals occupying the first subset of branch channels, to attenuate trunk signals occupying a corresponding first subset of trunk channels and to couple the first subset of branch signals and remaining trunk signals to provide a trunk output signal. The second filter may be configured to pass branch signals occupying the second subset of branch channels, to attenuate trunk signals occupying a corresponding second subset of trunk channels and to couple the second subset of branch signals and remaining trunk signals to provide a trunk output signal. Accordingly, a branching unit consistent with the present disclosure may provide flexibility in channel utilization for trunk and/or branch signals, e.g., may allow reallocation of express, add and/or drop channels.

Turning again to FIG. 2, the filter stage 250 may include a plurality of filters. Each filter 250-1, . . . , 250-N-1 may be configured to couple a trunk signal occupying a respective channel of the WDM trunk input signal 210 with a branch signal occupying a respective channel of the WDM branch input signal 220 and to provide an output including the respective trunk and branch signals. The respective trunk and branch signals selected for coupling and the selected filter may be selected based, at least in part, on a command from a controller, e.g., controller 310. For example, the controller 310 may be configured to receive a command from a terminal, e.g., trunk terminal 110 or 120 or branch terminal 150 or 160 shown in FIG. 1. Based on the command, the controller 310 may provide a command signal to the trunk input switch 212, branch input switch 222, filter switch 252 and filter stage 250, for selecting a respective one of the N-1 filters 250-1, . . . , 250-N-1, for filtering and coupling the trunk input signal 210 and branch input signal 220 for providing the trunk output signal 230.

For example, filter 250-1 may be configured to couple trunk signals occupying a subset of trunk channels, e.g., trunk channels 210-2, . . . , 210-m, and a branch signal occupying a branch channel, e.g., branch channel 220-1, into WDM trunk output signal 230. Filter 250-2 may be configured to couple trunk signals occupying a smaller subset of trunk channels 210-3, . . . , 210-m and branch signals occupying a larger subset of branch channels 220-1 and 220-2 into WDM trunk output signal 230. Based on traffic, for example, filter 250-2 may be selected to increase the number of branch signals coupled to the trunk signals at branching unit 200. In this manner, flexibility may be provided in a branching unit consistent with the present disclosure. For example, filter stage 250 including a plurality of filters may be configured to reallocate a wavelength corresponding to an express channel to an add/drop channel.

Figure 6:
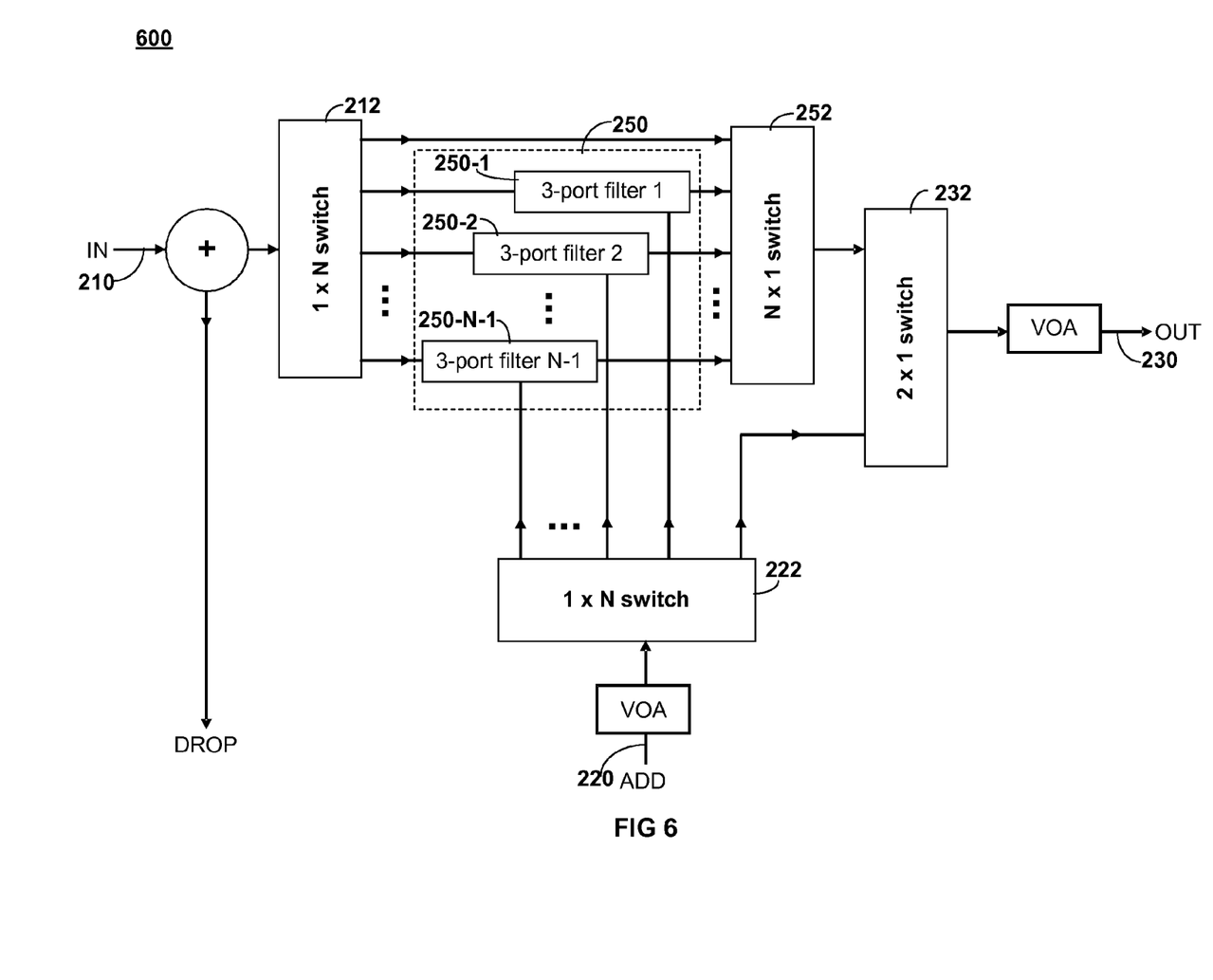
FIG. 6 is a functional block diagram of a flexible branching unit, including a plurality of 3-port filters, consistent with the present disclosure.

FIG. 6 shows another example of a flexible branching unit 600 consistent with the present disclosure. The filter stage 250 may include a plurality of filters. For example, the number associated with the optical switches 212, 222, 252 is N. Accordingly, the filter stage 250 includes N-1 filters 250-1, . . . , 250-N-1. The branching unit 600 may be configured to receive a WDM trunk input signal 210 and a WDM branch input signal 220 and to provide a WDM trunk output signal 230. If a fault is detected on a branch path coupled to branching unit 600, branching unit 600 may be configured to couple the WDM trunk input signal 210 to the WDM trunk output signal 230 using switches 212, 252 and 232, bypassing the filter stage 250. If a fault is detected on a trunk path coupled to branching unit 600, branching unit 600 may be configured to couple the WDM branch input signal 220 to the WDM trunk output signal 230 using switches 222 and 232, bypassing the filter stage 250. If no fault is detected, the branching unit 600 may be configured to couple the WDM trunk input signal 210 and the WDM branch input signal 220 to filter stage 250.

In this example, each filter 250-1, . . . , 250-N-1 is a 3-port filter. Each filter 250-1, . . . , 250-N-1 may be coupled to a respective output of the trunk input switch 212, a respective output of the branch input switch 222 and a respective filter stage output, e.g., filter stage output 256-1, . . . , 256-N-1. Each 3-port filter 250-1, . . . , 250-N-1 may be configured to receive the WDM trunk input signal 210 from the trunk input switch 212 and the WDM branch input signal 220 from the branch input switch 222 as inputs. Each 3-port filter 250-1, . . . , 250-N-1 may be configured to attenuate trunk signal(s) on wavelength bands corresponding to respective trunk channel(s) and to pass the remaining trunk signals. Each 3-port filter 250-1, . . . , 250-N-1 may be configured to pass branch channel(s) on wavelength bands corresponding to respective branch channel(s) and to attenuate the remaining branch signals. For example, a wavelength corresponding to a respective attenuated trunk channel may be the same as a wavelength corresponding to a respective passed branch channel. Each 3-port filter 250-1, . . . , 250-N-1 may be configured to combine the passed trunk signal(s) and passed branch signal(s) into a respective filter output signal and to provide each respective filter output signal to the respective filter stage output 256-1, . . . , 256-N-1.

The respective trunk signal(s) and branch signal(s) coupled to the respective filter stage output may be selected based on the command signal to the trunk input switch 212, branch input switch 222 and filter switch 252. This configuration may allow flexibility in allocating express and add/drop channels. Each 3-port filter 250-1, ..., 250-N-1 may be configured to couple a respective one or more trunk signals with a respective one or more branch signals. For example, a WDM system may initially include one add/drop channel. As system traffic changes, additional and/or different add/drop channels may be desirable. A branching unit consistent with the present disclosure, including a plurality of filters, may be configured to adjust the number of add/drop and express channels as system traffic changes.

Figure 7:
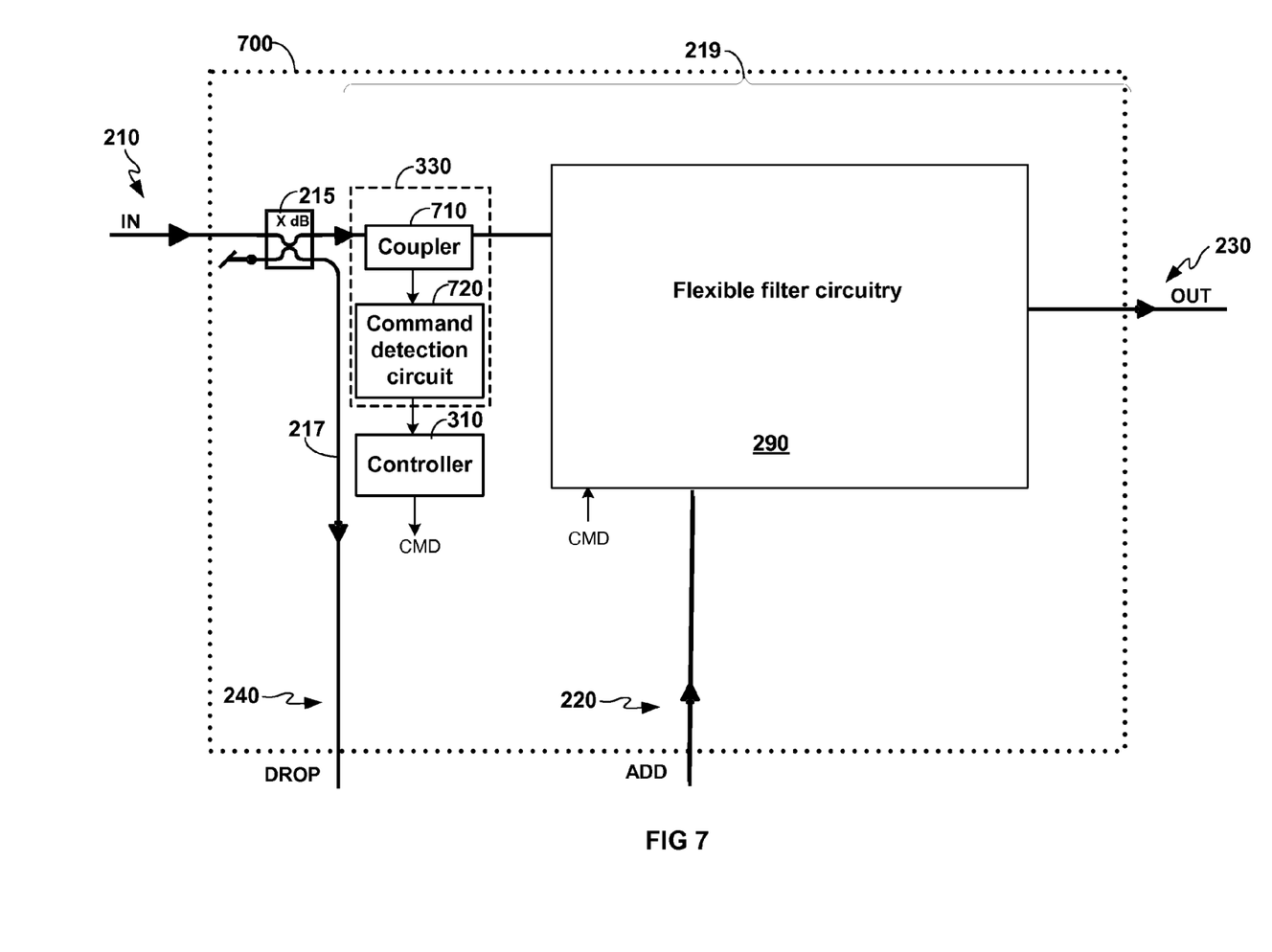
FIG. 7 is a functional block diagram of an example of an OADM that may be useful in a branching unit consistent with the present disclosure.

FIG. 7 depicts another example of an OADM 700 useful in a branching unit. The OADM 700 may be configured for adding and/or dropping one or more optical signals. For example, the OADM 700 may be configured to receive a WDM trunk input signal 210, including one or more trunk signals occupying one or more of a plurality of trunk channels, at a trunk input port, e.g., trunk input port IN, from segment 113 or 134 of FIG. 1. The OADM 700 may be configured to receive a branch input signal 220, including one or more branch signals occupying one or more of a plurality of branch channels, at a branch input port, e.g., branch input port ADD, from branch terminal 150 or 160 of FIG. 1. The OADM 700 may be configured to provide a WDM trunk output signal 230 at a trunk output port, e.g., trunk output port OUT, and a branch output signal 240 at a branch output port, e.g., branch output port DROP. The WDM trunk output signal 230 may include the WDM trunk input signal 210, the WDM branch input signal 220 or at least one trunk signal and at least one branch signal, based on whether a fault is detected.

OADM 700 may include flexible filter circuitry 290, for example, as described above and shown in FIG. 2. OADM 700 may include a coupler 215 configured to couple the trunk input signal 210 onto a drop path 217 and to the flexible filter circuitry 290. The coupler 215 may be an optical coupler as will be known to those of ordinary skill in the art. For example, the trunk input signal 210 may include a drop channel destined for a branch terminal, e.g., branch terminal 150 or 160, coupled to branch output port DROP.

The OADM 700 may include a remote command detection function 330. For example, the remote command detection function 330 may include a coupler 710 coupled to a command detection circuit 720. The coupler 710 may be coupled to the trunk coupler 215. The command detection circuit 720 may be coupled to a controller, e.g., controller 310. The controller 310 may be included in a control circuit, e.g., control circuit 300, as described herein.

The command detection function 330 may be configured to receive a remote command signal from a terminal, e.g., trunk terminals 110, 120 and/or branch terminals 150, 160. For example, the remote command signal may be sent from a terminal to the branching unit. The remote command signal may be extracted from the trunk input signal 210 by coupler 710. The extracted remote command signal may then be provided to the command detection circuit 720. The command detection circuit 720 may then provide a signal representative of the remote command signal to the controller 330 and/or may provide a command signal representative of the remote command signal to flexible filter circuitry 290 to, e.g., select a filter, a through path and/or set an attenuation level.

The controller 310 may be configured to monitor the OADM 700, a branching unit, a trunk path, e.g., trunk path 112, and/or a branch path, e.g., branch path 152 or 162, for a fault. Based on a result of the monitoring, the controller 310 may be configured to provide a command signal CMD to the flexible filter circuitry 290. For example, if a fault is detected on the trunk path, the controller 310 may send a command to the flexible filter circuitry 290 to couple the branch input signal 220 from the branch input port ADD to the trunk output port OUT. In another example, if a fault is detected on the branch path, e.g., branch path 152, 162, the controller 310 may send a command to the flexible filter circuitry 290 to couple the trunk input signal 210 from the trunk input port IN to the trunk output port OUT.

Accordingly, in the absence of a fault on the trunk path, the WDM trunk input signal 210, including one or more trunk signals occupying one or more trunk channels, may be uniformly loaded. If a fault is detected on a branch path, the uniformly loaded WDM trunk input signal 210 received at the trunk input port IN and including the trunk signal(s), may then be provided to the trunk output port OUT and may not be affected by the fault on the branch path. Similarly, in the absence of a fault on the branch path, the WDM branch input signal 220 received at the branch input port ADD and including one or more branch signals occupying one or more branch channels, may be uniformly loaded. If a fault is detected on the trunk path, the uniformly loaded WDM branch input signal 220, including the branch signal(s), may then be provided to the trunk output port OUT. If no fault is detected on the branch path or the trunk path, a respective trunk signal may be coupled to a respective branch signal by flexible filter circuitry 290. The WDM trunk output signal, including the respective branch signal(s) and respective trunk signal(s) may then be provided to port OUT. In this manner, a fault detected on a trunk or branch path may not affect signal from another path, providing fault tolerance.

Although the OADM 700 is shown with ports and components for handling optical signals propagating in one direction, the OADM 700 may be bidirectional and may include similar functionality for signals propagating in the opposite direction. Accordingly, the OADM 700 may be configured to couple a WDM trunk input signal to a trunk output port if a fault is detected on a branch path, couple a WDM branch input signal to the trunk output port if a fault is detected on a trunk path or to couple a portion of the trunk input signal and a portion of the branch input signal to the trunk output port if no fault is detected, bi-directionally.

A branching unit and/or an OADM consistent with the present disclosure may provide fault tolerance and/or flexibility in channel utilization of a branched WDM communication system as described herein. For example, if a fault is detected on a branch path or a trunk path, respectively, the branching and/or OADM may be configured to provide a trunk output signal including the trunk input signal or the branch input signal, respectively. In another example, a filter stage may include a plurality of filters configured to couple one or more trunk signals from a trunk path to one or more branch channels from a branch path. Each filter in the plurality of filters may be configured to couple a respective one or more trunk signals to a respective one or more branch signals. A filter, and therefore respective trunk and branch signals selected for coupling, may be selected based, at least in part on traffic.

According to one aspect of the present disclosure, there is provided a wavelength division multiplexed (WDM) optical system including: a trunk terminal configured to provide a WDM trunk input signal on a trunk path, the WDM trunk input signal including one or more trunk signals occupying one or more trunk channels; a branch terminal configured to provide a WDM branch input signal on a branch path, the WDM branch input signal including one or more branch signals occupying one or more branch channels; and a branching unit coupled to the trunk path and the branch path for receiving the WDM trunk input signal and the WDM branch input signal and providing a WDM trunk output signal on the trunk path, the WDM trunk output signal including the WDM trunk input signal if a fault is detected on the branch path, the WDM branch input signal if a fault is detected on the trunk path or at least one trunk signal and at least one branch signal if no fault is detected.

According to another aspect of the disclosure, there is provided an optical add/drop multiplexer including: a trunk input for receiving a WDM trunk input signal from a trunk path, the WDM trunk input signal including one or more trunk signals occupying one or more trunk channels; a branch input for receiving a WDM branch input signal from a branch path, the WDM branch input signal including one or more branch signals occupying one or more branch channels; and a plurality of switches, the plurality of switches configured to selectively couple the WDM trunk input signal to the WDM trunk output signal if a fault is detected on the branch path, the WDM branch input signal to the WDM trunk output signal if a fault is detected on the trunk path or at least one trunk signal and at least one branch signal to the WDM trunk output signal if no fault is detected.

According to yet another aspect of the disclosure, there is provided a method for fault tolerance in a branched WDM optical network including: transmitting a WDM trunk input signal on a trunk path, the WDM trunk input signal including one or more trunk signals occupying one or more trunk channels; transmitting a WDM branch input signal on a branch path, the WDM branch input signal including one or more branch signals occupying one or more branch channels; receiving the WDM trunk input signal and the WDM branch input signal at a branching unit; and providing a WDM trunk output signal including the WDM trunk input signal if a fault is detected on the branch path, the WDM branch input signal if a fault is detected on the trunk path or at least one trunk signal and at least one branch signal if no fault is detected.

The embodiments that have been described herein, however, are but some of the several which utilize this invention and are set forth here by way of illustration but not of limitation. Many other embodiments, which will be readily apparent to those skilled in the art, may be made without departing materially from the spirit and scope of the invention as defined in the appended claims.

What is claimed is:

1. A wavelength division multiplexed (WDM) optical system comprising:
   a trunk terminal configured to provide a WDM trunk input signal on a trunk path, said WDM trunk input signal comprising one or more trunk signals occupying one or more of a plurality of trunk channels;
   a branch terminal configured to provide a WDM branch input signal on a branch path, said WDM branch input signal comprising one or more branch signals occupying one or more of a plurality of branch channels; and
   a branching unit coupled to said trunk path and said branch path for receiving said WDM trunk input signal and said WDM branch input signal and providing a WDM trunk output signal on said trunk path, said WDM trunk output signal comprising said WDM trunk input signal if a fault is detected on said branch path, said WDM branch input signal if a fault is detected on said trunk path, or at least one trunk signal and at least one branch signal if no fault is detected, said branching unit comprising
   a trunk input switch having an input coupled to said WDM trunk input signal,
   a branch input switch having an input coupled to said WDM branch input signal,
   a trunk output switch having an output for providing said WDM trunk output signal,
   a filter switch having an output coupled to said trunk output switch, and
   a filter stage coupled between said trunk input switch and said filter switch, said filter stage comprising at least one filter for passing only selected ones of said trunk signals or said branch signals to said WDM trunk output signal,
   said trunk input switch having a first output coupled to said filter stage and a second output directly coupled to said filter switch,
   said branch input switch having a first output coupled to said filter stage and a second output coupled directly to said trunk output switch,
   whereby if said fault is detected on said branch path, said trunk input switch is configured to bypass said filter stage and provide said WDM trunk input signal as said WDM trunk output signal through said filter switch, and if said fault is detected on said trunk path, said branch input switch is configured to bypass said filter stage and provide said WDM branch input signal as said WDM trunk output signal through said trunk output switch.

2. A system according to claim 1 wherein said at least one trunk signal and said at least one branch signal are selected based, at least in part, on a command signal.

3. A system according to claim 1 further comprising a controller configured to monitor said trunk path and said branch path for a fault.

4. A system according to claim 3 wherein said controller is configured to provide a command signal based on said monitoring.

5. An optical add/drop multiplexer comprising:
   a trunk input for receiving a WDM trunk input signal from a trunk path, said WDM trunk input signal comprising one or more trunk signals occupying one or more of a plurality of trunk channels;
   a branch input for receiving a WDM branch input signal from a branch path, said WDM branch input signal comprising one or more branch signals occupying one or more of a plurality of branch channels;
   a trunk output for providing said WDM trunk input signal as a WDM trunk output signal if a fault is detected on said branch path, said WDM branch input signal as said WDM trunk output signal if a fault is detected on said trunk path, or at least one trunk signal and at least one branch signal as said WDM trunk output signal if no fault is detected;
   a trunk input switch having an input coupled to said WDM trunk input signal;
   a branch input switch having an input coupled to said WDM branch input signal;
   a trunk output switch having an output for providing said WDM trunk output signal;
   a filter switch having an output coupled to said trunk output switch; and
   a filter stage coupled between said trunk input switch and said filter switch, said filter stage comprising at least one filter for passing only selected ones of said trunk signals or said branch signals to said WDM trunk output signal,
   said trunk input switch having a first output coupled to said filter stage and a second output directly coupled to said filter switch,
   said branch input switch having a first output coupled to said filter stage and a second output coupled directly to said trunk output switch, whereby if said fault is detected on said branch path, said trunk input switch is configured to bypass said filter stage and provide said WDM trunk input signal as said WDM trunk output signal through said filter switch, and if said fault is detected on said trunk path, said branch input switch is configured to bypass said filter stage and provide said WDM branch input signal as said WDM trunk output signal through said trunk output switch.

6. An optical add/drop multiplexer according to claim 5 wherein said at least one trunk signal and said at least one branch signal are selected based, at least in part, on a command signal.

7. An optical add/drop multiplexer according to claim 5, further comprising a controller configured to monitor said trunk path and said branch path for a fault.

8. A method for fault tolerance in a branched WDM optical network comprising:
   transmitting a WDM trunk input signal on a trunk path, said WDM trunk input signal comprising one or more trunk signals occupying one or more of a plurality of trunk channels;
   transmitting a WDM branch input signal on a branch path, said WDM branch input signal comprising one or more branch signals occupying one or more of a plurality of branch channels;
   receiving said WDM trunk input signal and said WDM branch input signal at a branching unit;
   providing a WDM trunk output signal comprising said WDM trunk input signal if a fault is detected on said branch path, said WDM branch input signal if a fault is detected on said trunk path, or at least one trunk signal and at least one branch signal if no fault is detected; and
   providing a command signal to a plurality of switches to selectively couple said WDM trunk input signal to said WDM trunk output signal if a fault is detected on said branch path, said WDM branch input signal to said WDM trunk output signal if a fault is detected on said trunk path or said at least one trunk signal and said at least one branch signal through a filter stage to said WDM trunk output signal if no fault is detected, said plurality of switches comprising
   a trunk input switch having an input coupled to said WDM trunk input signal,
   a branch input switch having an input coupled to said WDM branch input signal,
   a trunk output switch having an output for providing said WDM trunk output signal, and
   a filter switch having an output coupled to said trunk output switch,
   said filter stage being coupled between said trunk input switch and said filter switch, said filter stage comprising at least one filter for passing only selected ones of said trunk signals or said branch signals to said WDM trunk output signal,
   said trunk input switch having a first output coupled to said filter stage and a second output directly coupled to said filter switch,
   said branch input switch having a first output coupled to said filter stage and a second output coupled directly to said trunk output switch,
   whereby if said fault is detected on said branch path, said trunk input switch is configured to bypass said filter stage and provide said WDM trunk input signal as said WDM trunk output signal through said filter switch, and if said fault is detected on said trunk path, said branch input switch is configured to bypass said filter stage and provide said WDM branch input signal as said WDM trunk output signal through said trunk output switch.

9. A method according to claim 8, further comprising selecting said at least one trunk signal and said at least one branch signal based, at least in part, on a command signal.

10. A method according to claim 9, wherein said trunk input signal comprises said command signal.

11. A method according to claim 8, further comprising monitoring said trunk path and said branch path for a fault.

12. A method according to claim 11, wherein said monitoring is performed by a controller.

\* \* \* \* \*